(12) United States Patent
Sprenger et al.

(10) Patent No.: US 6,273,366 B1
(45) Date of Patent: Aug. 14, 2001

(54) PATIENT TRANSPORT ARRANGEMENT IN AN AIRCRAFT

(75) Inventors: Wilfried Sprenger, Issendorf; Ralf Schliwa, Dollern; Mikko Gabriel, Stuttgart; Michael Deppe, Bechum; Erich Foucar, Seewald; Hans Lobentanzer, Mannheim, all of (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/337,074

(22) Filed: Jun. 21, 1999

(30) Foreign Application Priority Data

Jun. 19, 1998 (DE) ................................. 198 27 275

(51) Int. Cl.[7] .......................... B64D 11/00; B64D 13/00; B64D 11/06; B64D 47/00; B64D 1/08; B64D 9/00; B64C 1/20; B64C 1/22
(52) U.S. Cl. .................................. 244/118.5; 244/137.2; 244/118.1; 244/118.6
(58) Field of Search ............................ 244/118.5, 118.6, 244/118.1, 137.1, 137.2; 52/238.1

(56) References Cited

U.S. PATENT DOCUMENTS

| | | | |
|---|---|---|---|
| 4,115,884 | 9/1978 | Keough | 5/625 |
| 4,458,864 | * 7/1984 | Colombo et al. | 244/118.5 |
| 5,259,575 | * 11/1993 | Cabrera | 244/118.5 |
| 5,383,629 | * 1/1995 | Morgan | 244/118.6 |
| 5,577,358 | * 11/1996 | Franke | 52/238.1 |
| 5,615,848 | * 4/1997 | Ceriani | 244/118.5 |
| 5,813,629 | * 9/1998 | Cabrera | 244/118.6 |

OTHER PUBLICATIONS

H. Siegmund, article entitled "Intensivstation für Flugzeuge", in publication "Aero International", Aug. 1996, pp. 56 et. seq.
F. Kahrt, article entitled "Checklist–Gerüstet für alle Fälle", in publication Lufthansa Bordbuch, Apr. 1997, p. 12.

* cited by examiner

Primary Examiner—Charles T. Jordan
Assistant Examiner—Christian M. Best
(74) Attorney, Agent, or Firm—W. F. Fasse; W. G. Fasse (57) ABSTRACT

A patient transport arrangement is provided in the passenger cabin of an aircraft and includes a patient stretcher, medical supplies and equipment, and a compartment that is variably and adaptably useable as a restroom compartment and as a medical care compartment. The compartment is arranged adjacent to the doorway clearance area in front of the cabin door of the aircraft. The adaptable compartment includes a foldable wall element so that the stretcher can extend at least partially into the compartment during take-off, landing and ground operations of the aircraft while leaving the doorway clearance area unobstructed, and so that the stretcher can be repositioned out of the compartment and into the doorway clearance area during cruise flight so as to allow the compartment to be used as a passenger restroom during the flight. This arrangement makes efficient use of space within the passenger cabin that would otherwise be unused during various phases of flight.

28 Claims, 7 Drawing Sheets

PATIENT TRANSPORT ARRANGEMENT IN AN AIRCRAFT

PRIORITY CLAIM

This application is based on and claims the priority under 35 U.S.C. §119 of German Patent Application 198 27 275.8, filed on Jun. 19, 1998, the entire disclosure of which is incorporated herein by reference.

FIELD OF THE INVENTION

The invention relates to an arrangement for transporting a sick or injured patient in an aircraft, whereby the arrangement can be installed within the passenger cabin of the aircraft and be embodied as a patient transport unit, which comprises at least medical supplies and treatment devices as well as a patient supporting stretcher.

BACKGROUND INFORMATION

Previously it has been typical to use specially chartered ambulance aircraft for retrieving and returning an ill or injured person from a location of injury or illness back to his or her home location for treatment. However, such specially chartered air ambulance flights are extremely expensive, so that such medical return or recovery services have only been available to a rather limited range of people who had the financial resources or appropriate insurance to pay for such a service. In any event, such a service is cost intensive for the insurers providing such travel insurance covering illnesses, injuries or other medical emergencies of a person while traveling.

The publication "Aero International" August 1996, beginning on page 56, describes a patient transport system (PTS) with which it is possible to transport patients in ordinary commercial airline aircraft, and especially long haul aircraft. Such a patient transport system with the corresponding appropriate medical devices is provided for the observation and care of accident victims and seriously ill patients. It is embodied as a cabin which can be selectively installed in a passenger cabin of an aircraft as needed. However, to achieve this, twelve economy class passenger seats must be removed from the passenger cabin. Such a loss of passenger seats is sometimes not acceptable to the airline for economic reasons.

For example, in the event of a fully booked flight, it is not possible to remove from the passenger cabin any passenger seats that have already been fully "paid for". In this case, it would not be possible to install and use a patient transport system on short notice, and thus the transport of the accident victim or the like would have to be delayed until a flight with available unsold seats is scheduled. This is problematic, because accident victims or seriously ill patients often require immediate transportation to an appropriate medical facility, as a matter of life or death.

Furthermore, up to the present time, it has not been possible to provide an adequate level of care for emergency or accident victims during a flight. If a medical emergency or other medical incident occurs during a flight, and medical care or treatment is necessary, the typical procedure is that the aircraft simply flies to the next available airport. Such an unscheduled intermediary landing and take-off causes several disadvantages or problems, for example that fuel may have to be dumped i.e. jettisoned, and that additional airport fees will have to be paid. Also, of course, a great inconvenience arises for all the passengers who suffer an increased delay and waiting time, and possibly missed connecting flights and the like. For these reasons, such a procedure necessarily involves additional costs for the airline.

SUMMARY OF THE INVENTION

In view of the above, it is an object of the invention to provide an arrangement for transporting a patient in an aircraft, which flexibly and economically provides the respective needed patient transport capacity, while also meeting all the needs of a modern medical rescue service. The invention further aims to avoid or overcome the disadvantages of the prior art, and to achieve additional advantages, as apparent from the present specification.

The above objects have been achieved according to the invention in an arrangement for transporting a patient in an aircraft, which is embodied as a patient transport unit that can be selectively and adjustably installed in an aircraft passenger cabin, and that includes at least medical supplies and/or medical devices, as well as a patient supporting stretcher or the like. Especially according to the invention, the patient transport unit is installed in the aircraft adjacent to or neighboring the doorway clearance area of the passenger cabin of the aircraft. The patient transport unit is selectively coupleable and interfaceable with a useable space within a compartment such as a toilet or restroom compartment, or a storage compartment or closet near the aircraft door. The patient transport unit is so configured and arranged that the patient stretcher occupies at least a portion of the doorway clearance area during flight, but is moved out of the doorway clearance area during take-off, landing, boarding, and deplaning operations. Also, the stretcher may be arranged at least partially within the restroom compartment, for example during take-off, landing, boarding and deplaning.

It is especially advantageous that the inventive arrangement provides a very economical and adaptable system for transporting one or more patients on any given flight of a passenger aircraft.

The arrangement is flexibly deployable so that it is only used by the airline when it is needed for the transport of a patient, and it occupies only a minimum of space in the aircraft that would otherwise be available for ordinary passengers. This efficient use of space within the aircraft is especially achieved since the doorway clearance area in front of and around the aircraft door is generally "wasted space", i.e. non-utilized space, during a flight, because this area is only used for the boarding and deplaning of passengers. Thus, during a flight, this area can efficiently be used for receiving the patient stretcher therein.

BRIEF DESCRIPTION OF THE DRAWINGS

In order that the invention may be clearly understood it will now be described in connection with example embodiments, with reference to the accompanying figures, wherein.

DETAILED DESCRIPTION OF PREFERRED EXAMPLE EMBODIMENTS AND OF THE BEST MODE OF THE INVENTION

Figure 1:
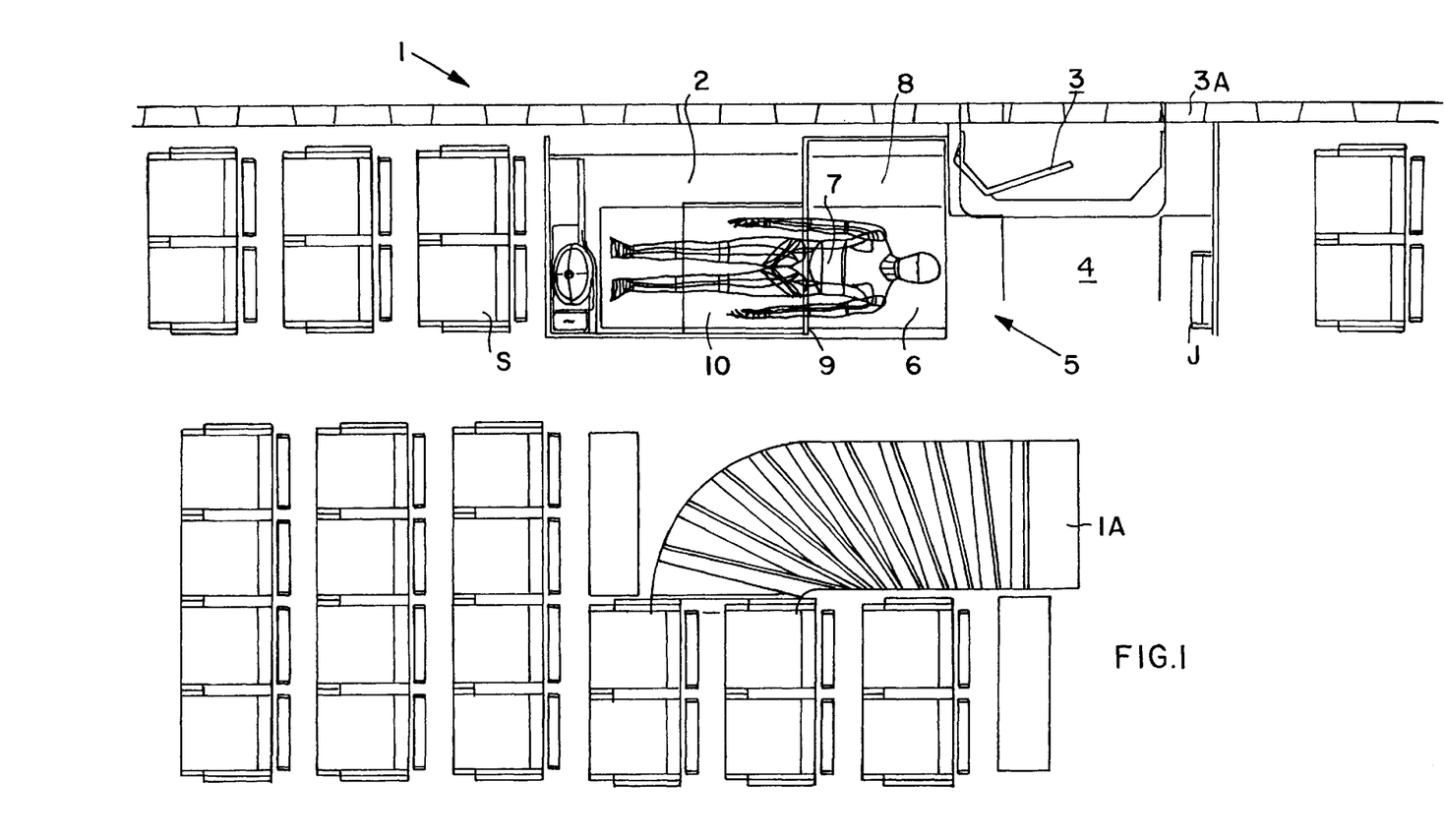
FIG. 1 is a schematic top plan view of a portion of a cabin layout of a passenger aircraft including a first embodiment of a patient transport arrangement according to the invention, in a configuration during take-off, landing, boarding, and deplaning.
Figure 2:
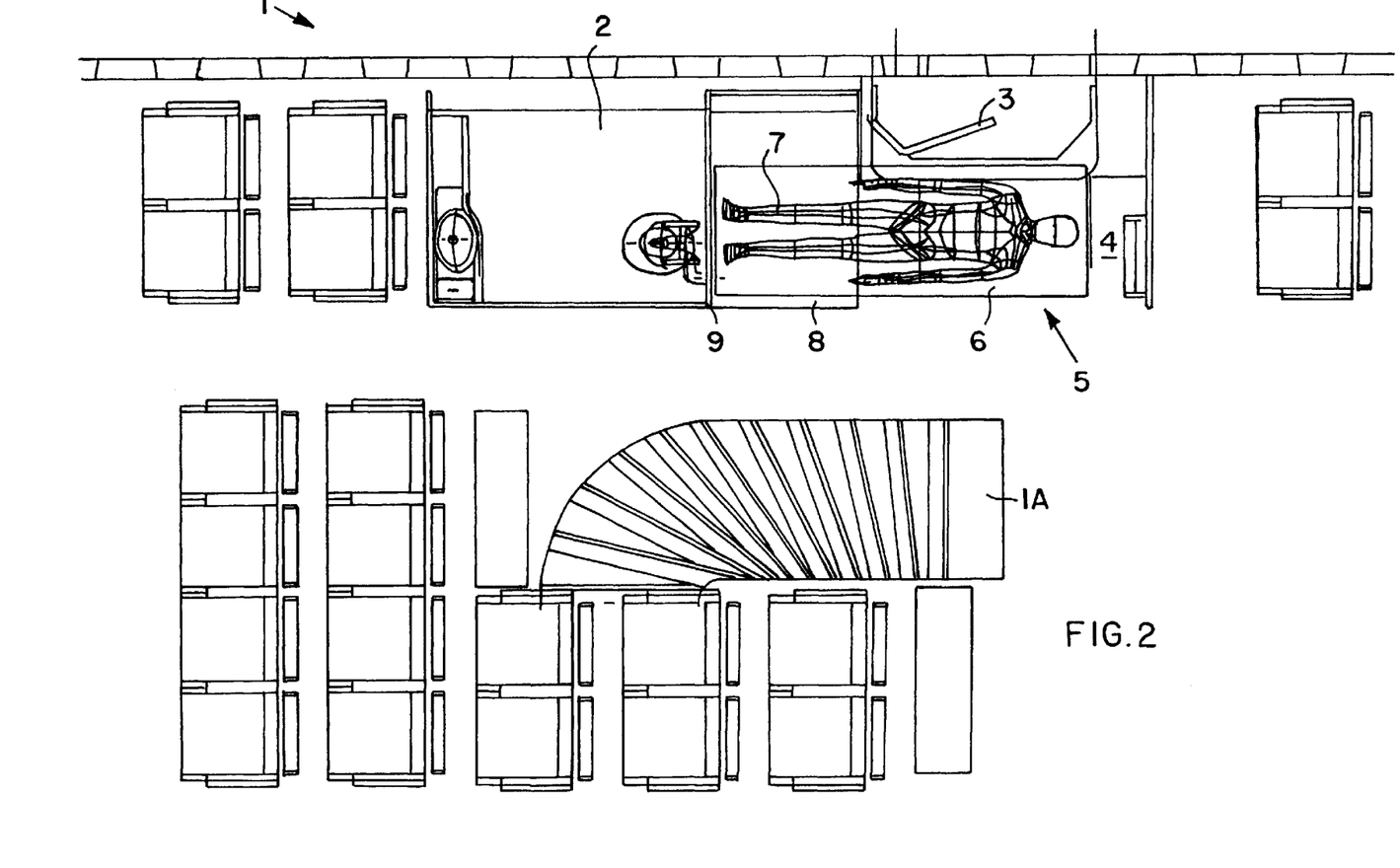
FIG. 2 is a schematic top plan view showing the first embodiment according to FIG. 1, but in a configuration during a flight.

FIG. 1 schematically shows a portion of the top plan view of an aircraft passenger cabin 1, showing the layout or arrangement of passenger seats S as well as various useable spaces or compartments, such as a toilet compartment or restroom 2 as well as a stairway 1A in the passenger cabin 1. The aircraft is a passenger aircraft with at least 16 passenger seats S (FIGS. 3, 4) or more (FIGS. 1, 2). A plurality of toilet compartments or restrooms 2 are distributed throughout the entire passenger cabin 1, depending on and corresponding to the passenger seating capacity provided in the cabin 1. The restroom 2 is preferably a handicapped accessible restroom for the present embodiment of the invention, because such a restroom typically has larger dimensions than a conventional aircraft restroom without special accessibility. When used as a restroom, the enlarged dimensions provide easy access for a person in a wheelchair or the like. An aircraft cabin should be provided with at least one such handicapped accessible restroom in general, but such a larger restroom is especially suitable for use in connection with the invention as follows.

FIG. 1 shows only a single restroom 2 as an example, whereby this restroom 2 is arranged adjacent to one of the aircraft exits, i.e. one of the aircraft doors 3 providing an opening through the fuselage 3A for the boarding and deplaning of passengers. It should be understood that a corresponding greater number of the inventive arrangements can be used in connection with restroom compartments provided throughout the aircraft cabin, especially near the cabin doors, although only a single inventive arrangement is shown and described herein.

As prescribed by aviation regulations, a doorway clearance area 4 in front of the cabin door 3 must be unoccupied and unobstructed during take-off, landing, and ground operations of the aircraft. However, during flight, this otherwise vacant doorway clearance area 4 may be occupied. Therefore, it is known to arrange a foldable flight attendant jump seat J or the like adjacent to the doorway clearance area 4 so that the jump seat J occupies a portion of the area 4 during flight. The inventive arrangement also makes use of this area 4 during flight.

A patient transport unit 5 or so-called "medical compartment" 5 is arranged in the doorway clearance area 4 of the aircraft door 3 whenever it is needed for transporting a patient, and is connected to and interfaces with the restroom 2. Such a transport unit 5 comprises a patient stretcher 6, which may be any type of patient supporting surface or portable bed, as well as medical supplies and medical treatment and care equipment such as an oxygen supply device, a respirator, a defibrillator, an emergency medical or first aid supply kit, and the like (which are not shown). Using such a patient transport unit 5, a patient 7 who is in need of medical care can be transported directly in the passenger cabin of the aircraft being used by a commercial airline. In contrast, such a patient would normally have had to be transported by means of special medical transport facilities, according to the known state of the art.

In order to interface with the patient transport unit 5, the restroom 2 may be generally conventional, but comprises at least one endwall 9 including an openable door or wall element, such as a fold-down element 10. Also, a storage cabinet or compartment 8 is arranged directly adjacent and below the openable portion of the endwall 9 of the restroom 2. When a patient 7 is to be transported on a stretcher 6 in the transport unit 5, the fold-down element 10 of the endwall 9 of the restroom 2 is folded down into a horizontal position either outside of the restroom 2 on top of the storage compartment 8 or inside of the restroom 2 (also see FIG. 5). In this configuration, the fold-down wall element 10 for example covers the toilet 11, and forms a surface extension of the top surface of the storage compartment 8, for supporting the patient stretcher 6 thereon. Moreover, the patient stretcher extends and is supported partially within the restroom 2 on the fold-down wall element 10 and partially outside of the restroom 2 on top of the storage compartment 8, while extending parallel to the aircraft longitudinal axis through the opening provided by the fold-down wall element 10 in the endwall 9.

As shown in FIG. 1, in this configuration, the patient 7 and stretcher 6 do not obstruct the doorway clearance area 4, but do obstruct or prevent the normal full use of the restroom 2. Such a configuration is fully suitable during take-off, landing and ground operations, when the doorway clearance area 4 must remain unobstructed, but the restroom is not to be used by passengers. The obstruction of the restroom by the stretcher during take-off, landing and ground operations of the aircraft therefore does not at all encroach on the normal functionality of the restroom. Also in this configuration, the storage compartment 8 can be used for storing the necessary medical supplies and devices for the proper care of the patient 7.

On the other hand, when there is no need to transport a patient in a given flight, the foldable element 10 of the endwall 9 is closed and secured in its vertical position, and the restroom 2 can be used by the passengers of the cabin 1 in the ordinary manner without any loss of space or functionality. Meanwhile the storage cabinet or compartment 8 can be used as a luggage compartment or the like for normal passengers or for the flight crew. Also, the top of the storage cabinet or compartment 8 can be equipped with a passenger seating bench, or serve as a convenience table for the passengers. Thus, the space otherwise occupied by the patient transport unit 5 can be fully utilized by the passengers and the flight crew when it is not needed for the transport of a patient 7. In the event that passenger seats are installed on top of the storage compartment 8, the seat backs of these seats are removable or fully tiltable into a flat horizontal position so as to provide a level support surface as an extension of the fold-down wall element 10 for receiving the stretcher 6 thereon when a patient needs to be transported.

Thus, the inventive combination and particular configuration of a patient transport unit 5 with a handicapped accessible restroom 2 does not detract from or diminish the usual comfort functions provided for the passengers, and also does not occupy any additional space in the aircraft that would otherwise have been put to effective use, when a patient transport is not required. The inventive arrangement achieves a similar advantageous use and allocation of space even when a patient needs to be transported, as will be described next with reference to FIG. 2. While the doorway clearance area 4 must be unobstructed for passage by passengers during boarding and deplaning, this area 4 may be occupied during the cruise flight of the aircraft. On the other hand, during the cruise flight phase, it is desirable to maintain the full functionality and availability of the restroom 2 for use by passengers. The invention makes good use of this change in the availability or allocation of space within the aircraft cabin 1, as shown in FIG. 2. Namely, during the flight, the patient stretcher 6 with the patient 7 thereon is pulled out of the restroom 2 through the opening provided by the fold-down wall element 10 to a sufficient extent that the restroom 2 can again be used as a toilet. It is especially preferred that the stretcher 6 is pulled entirely out of the restroom 2, so that the fold-down wall element 10 can again be tilted up and secured in its closed position to provide a closed or solid endwall 9 to ensure the privacy and comfort of any passenger using the restroom 2. At this time, the stretcher 6 is arranged and supported on the storage compartment 8 and in the doorway clearance area 4 (which may be utilized during cruise flight).

The combination of the single service compartment 2 as both a restroom and a part of the patient transport unit 5 is also efficient and advantageous, not only for the most efficacious allocation of space during different phases of a flight, but also to make good use of the various supply or service facilities. Namely, the water and electric power supply connections as well as the ventilation that is typically provided in the compartment 2 for use as a toilet or restroom are also needed and can be readily used for the medical care of the patient 7, either directly or through appropriate connections to the various medical devices.

The flexible utilization of the patient transport unit 5 in either configuration shown in FIG. 1 or FIG. 2 also depends on how intensive the medical observation and care of the patient 7 must be. If a continuous medical care or treatment is necessary, and especially if several medical personnel such as a doctor as well as a nurse or a medical technician must be immediately at hand, then the compartment 2 can be completely and continuously used as a medical compartment, for example, for housing the necessary medical equipment and supplies and/or to provide space for the medical personnel to carry out their medical care services. Of course, in such a case, the use of the compartment 2 as a toilet or restroom for the passengers during flight would not be possible, and the passengers would therefore have to seek out the other restrooms available in the aircraft cabin. As a further alternative, the toilet provided in the restroom 2 can be made available for the exclusive use of the patient 7 during the flight, in order to provide a private compartment for the patient 7. In order to provide a physical separation and privacy screening between the patient 7 and the other passengers, a curtain or portable divider wall or the like (not shown) can be provided around the perimeter of the patient transport unit 5 and the doorway clearance area 4 of the aircraft.

Figure 5:
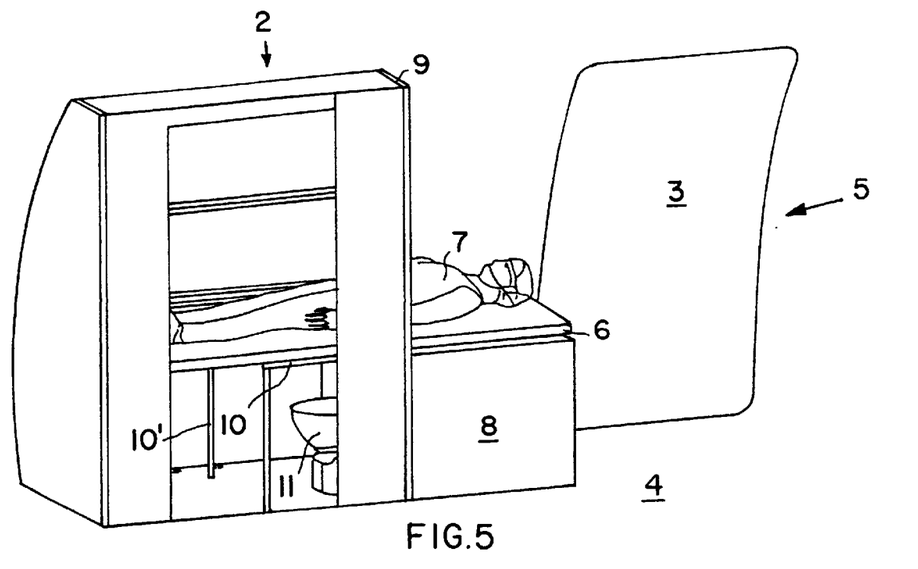
FIG. 5 is a schematic perspective view showing the arrangement according to FIG. 1.

FIG. 5 is a perspective view of the first embodiment of the patient transport unit 5 shown in FIG. 1. The door of the restroom 2 is shown open, or has been omitted for the sake of illustrative clarity, while the fold-down element 10 of the endwall 9 of the restroom 2 has been folded down and is supported on legs 10' for receiving the patient stretcher 6 thereon. Thus, an easy access to the patient 7 is provided through the open doorway of the restroom 2, as well as through the open area outside of the restroom 2 on top of the storage compartment 8. The patient 7 can be oriented on the stretcher 6 so that the portion or area of the body of the patient requiring the most easy access is positioned either inside or outside of the restroom 2, depending on the medical needs at hand. Also, the fold-down element 10 of the endwall 9 has a width and height, at a minimum, that are sufficient to allow the stretcher 6 and patient 7 to pass through the opening provided thereby. Moreover, for improved access to the patient, the fold-down element 10 and the corresponding opening in the endwall 9 may be larger than minimally necessary, to provide improved accessibility.

Figure 6:
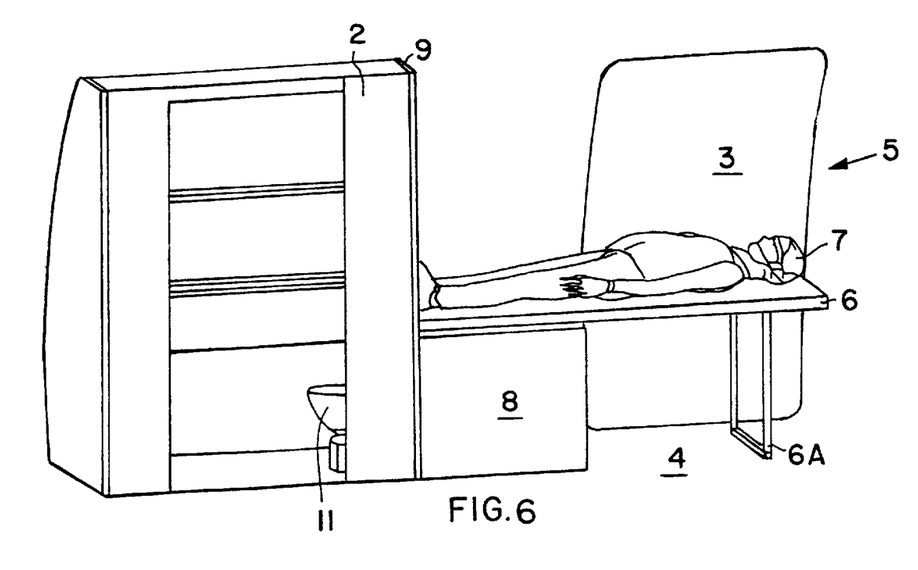
FIG. 6 is a schematic perspective showing the arrangement according to FIG. 2.

FIG. 6 shows a perspective view of the first embodiment of the patient transport unit 5 in the configuration as shown and described above in connection with FIG. 2. Namely, the patient transport unit 5 extends into the doorway clearance area 4 of the aircraft cabin 1 during the flight of the aircraft. The patient stretcher 6 has been pulled out of the restroom 2, whereby one end of the stretcher 6 is supported on the storage compartment 8 while the other end of the stretcher 6 is supported on legs or a support bail 6A. In this configuration of the patient transport unit 5, the aircraft door 3 is not accessible, which is permissible during cruise flight. On the other hand, the restroom 2 is made fully accessible because the fold-down wall element 10 has been tilted up and secured so as to close the opening in the endwall 9, so that the toilet 11 and washbasin provided in the restroom 2 may be used by passengers in the usual manner.

Figure 3:
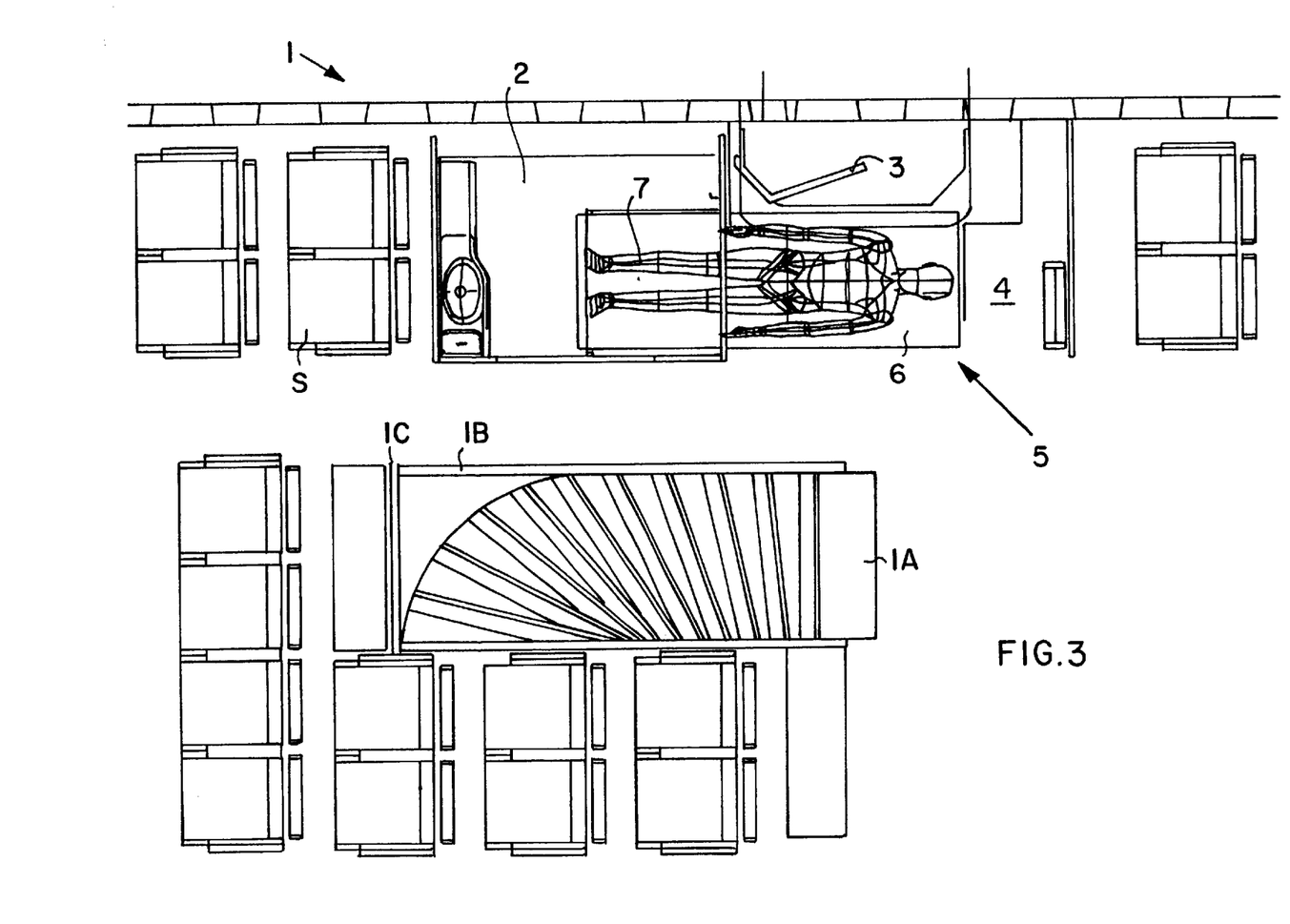
FIG. 3 is a schematic top plan view of a portion of a cabin layout of a passenger aircraft with a second embodiment of a patient transport arrangement according to the invention, in a configuration during a flight.

FIG. 3 shows a second embodiment of a patient transport unit 5 according to the invention. The restroom 2 is arranged directly adjacent to the aircraft door 3 and bordering on the doorway clearance area 4, without any space therebetween. There is no storage compartment 8 provided between the restroom 2 and the passage and clearance area 4, so that such a storage compartment 8 is not available for supporting the stretcher 6 thereon. Instead, shifting the restroom 2 in this manner has made space for an additional row of passenger seats S in the passenger cabin 1. In this embodiment, during flight the stretcher 6 is received and supported partially in the doorway clearance area 4 and partially in the restroom 2, and extends through the opening provided by the fold-down element 10 of the endwall 9 of the restroom 2. It is also possible, that both endwalls of the restroom 2 in the aircraft lengthwise direction can be folded down to allow the stretcher 6 to pass through both endwalls if need be, for example for conveniently sliding the stretcher 6 completely through the restroom 2. Since the restroom 2 is at least partially occupied by the stretcher 6, the restroom 2 is not available for normal use by the passengers during flight, so that they will have to use the other restrooms available in the cabin 1. Alternatively, by providing a screening wall or panel, at least a portion of the restroom, such as the washbasin, can be made available for passenger use.

If the doorway clearance area 4 must be kept completely unobstructed during the take-off and landing phases of flight, and therefore is not available for receiving the stretcher 6 in this area, it is alternatively possible to support the stretcher on other components in the aircraft cabin 1 during this time. For example, as mentioned above, the stretcher 6 could be pushed entirely into and partially through the restroom 2 by protruding partially through both endwalls of the restroom 2. In any event, it is always necessary to keep the passenger aisles unobstructed as an emergency escape path.

Figure 4:
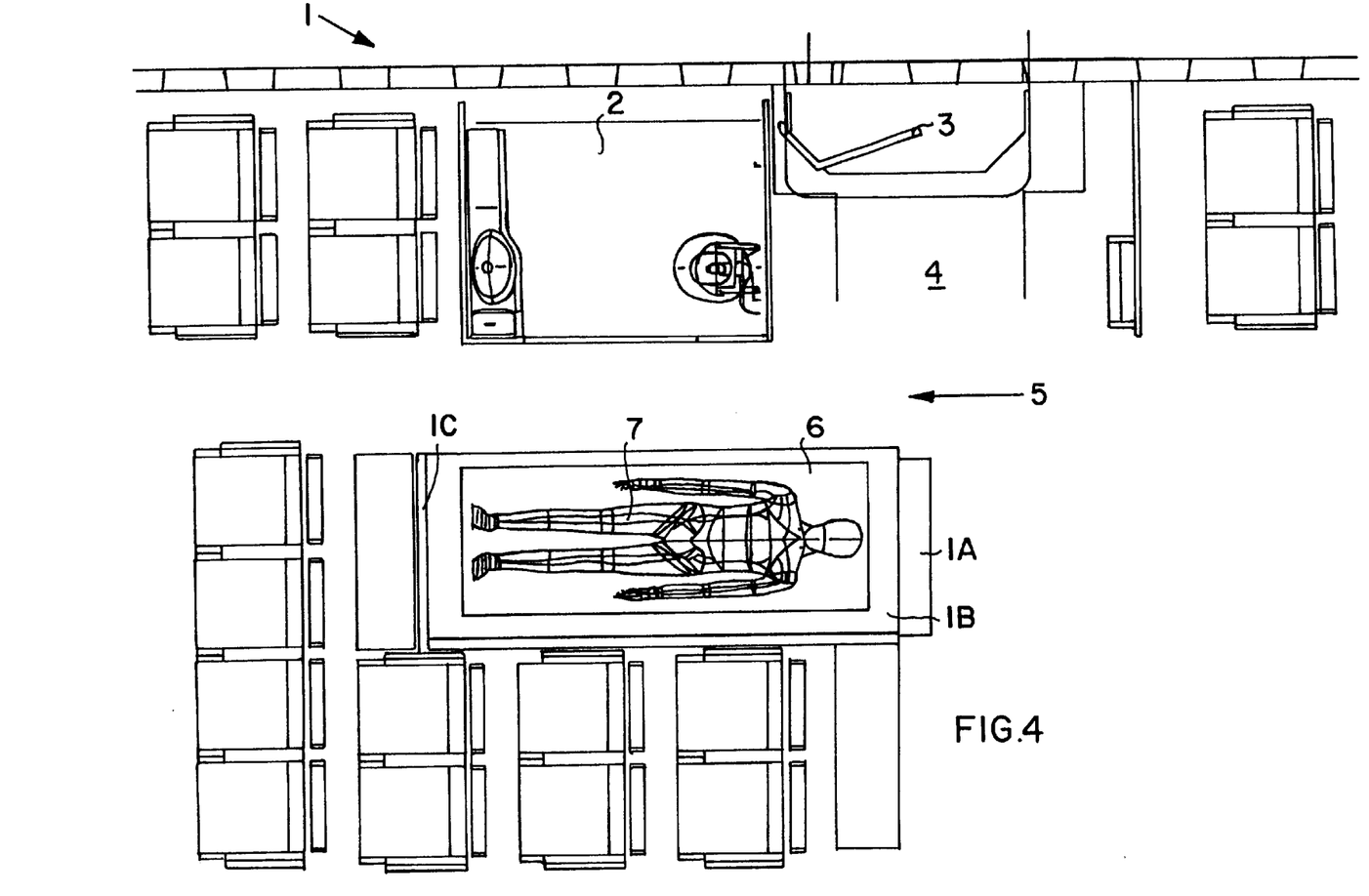
FIG. 4 is a schematic top plan view of the second embodiment according to FIG. 3, but in a configuration during landing.

Another possibility for receiving and supporting the stretcher 6 during the take-off and landing phases is shown in FIG. 4, wherein the aircraft includes a stairway 1A that leads from the main deck passenger cabin 1 into a below-deck space or a lower deck of the aircraft, which cannot be occupied or used by passengers during take-off and landing. Therefore, the stairway 1A is not needed for passenger use during these times either. Thus, the space of the stairway 1A can be efficiently utilized for receiving the stretcher 6 during these flight phases. Furthermore, this location of the stretcher 6 would not be any hindrance during boarding or deplaning of the passengers, because the stretcher 6 with the patient 7 can be immediately unloaded from the aircraft once the door 3 has been opened, before the normal deplaning of the other passengers commences. By the same consideration, the patient 7 on the stretcher 6 is brought onto the aircraft only after the normal boarding has been completed. In order to receive and support the stretcher 6 in the stairway 1A, at least the sidewall element 1B of the stairway enclosure can be folded down to form a support surface to receive the stretcher 6 thereon, while the endwall 1C of the stairway enclosure may be a fixed wall element. FIG. 4 shows the condition in which the stretcher 6 is supported on the folded-down sidewall 1B of the stairway 1A.

Figure 7:
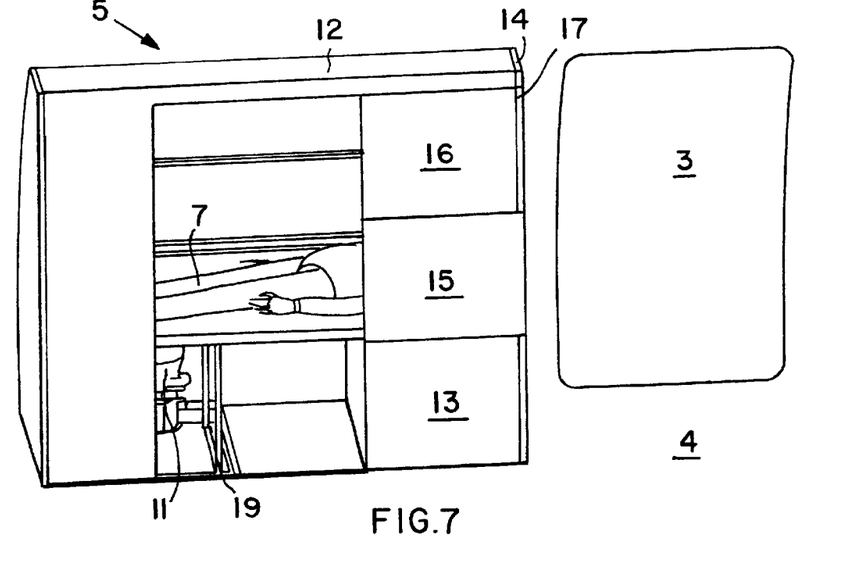
FIG. 7 is a schematic perspective view of a third embodiment of a patient transport arrangement according to 'the invention, in a take-off and landing configuration.
Figure 8:
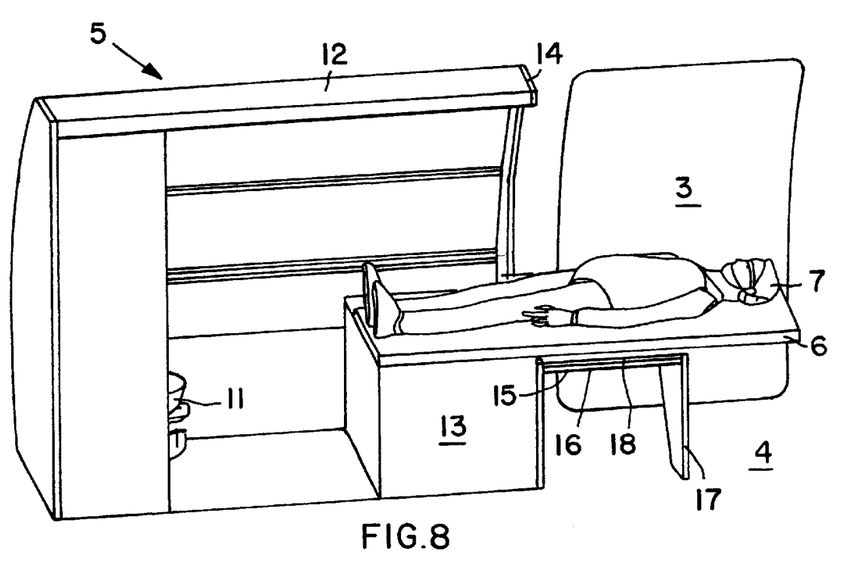
FIG. 8 is a schematic perspective view of the third embodiment according to FIG. 7, but in a flight configuration.

FIGS. 7 and 8 show a third embodiment of a patient transport unit 5. Rather than having the typical dimensions of a normal aircraft restroom or a handicapped accessible restroom, the useable compartment 12 has such dimensions that it can receive or house a patient stretcher 6 completely therein, and also includes a toilet 11 therein. This special compartment 12 combining a toilet 11 with a patient transport unit 5 can be arranged directly next to the aircraft door 3, and adjoining or bordering on the doorway clearance area 4.

FIG. 7 shows the compartment 12 with an open or omitted door for the sake of clarity. If it is not necessary to transport a patient on a given flight, then the compartment 12 can be used as a restroom by the passengers. In such a condition or configuration, a patient stretcher 6 may be stored in the compartment 12 in such a manner that it does not hinder the normal use of the toilet 11. For example, the stretcher 6 may be tilted vertically and secured against the back wall of the compartment 12. It can be advantageous to have such a stretcher on board at all times, even when it is not intended to transport a patient thereon, so that medical care can be quickly and conveniently provided in the event that a medical emergency or injury-causing accident occurs on board during the flight. For this reason, it is also advantageous to constantly store medical supplies, equipment, and devices, for example in a storage compartment 13 provided in the compartment 12.

When the stretcher 6 is needed for supporting a patient thereon, the stretcher 6 is arranged horizontally within the compartment 12, whereby one end of the stretcher 6 is supported on the storage compartment 13 or other components of the compartment 12, and the other end of the stretcher is supported on foldable legs 19 or the like, as shown in FIG. 7. Since the stretcher 6 with the patient 7 thereon is received completely in the compartment 12, once the door of the compartment 12 is closed, a complete privacy enclosure is provided for the patient 7, for example during the take-off and landing phases as well as during the boarding and deplaning of passengers.

FIG. 8 shows the configuration of the third embodiment of the patient transport unit 5 during the cruise flight phase. In this configuration, the stretcher 6 is partially pulled out of the compartment 12 by folding down foldable elements 17 and 18 of the endwall 14 of the compartment 12. The stretcher 6 then extends through the opening in the endwalls 14 provided by having folded down the wall elements 17 and 18, while these elements 17 and 18 form a support underneath the stretcher 6. As shown in FIG. 8, the stretcher 6 is thereby arranged at least partially utilizing and obstructing the doorway clearance area 4 in front of the cabin door 3. On the other hand, during flight with the stretcher 6 pushed at least partially out of the compartment 12, the toilet 11 located in the compartment 12 is freely accessible. Since no divider or separating wall is provided between the toilet 11 and the patient 7, it will not be possible for other passengers to use the toilet 11, but the toilet 11 would be available for the patient 7 to use, with the provision of appropriate screening measures.

In addition to the opening provided by the foldable elements 17 and 18 in the endwall 14 of the compartment 12, it is also possible to provide removable or foldable sidewall elements 15 and 16 as seen in a comparison of FIGS. 7 and 8, to provide a complete accessibility to the entire body of the patient 7. In the configuration shown in FIG. 8, the sidewall elements 15 and 16 have been folded relative to each other and folded down together with the sidewall elements 17 and 18 in such an arrangement so as to provide a stable support for the stretcher 6. Namely, the fold-down element 17 of the endwall 14 forms a supporting leg, while the foldable wall elements 15, 16 and 18 are connected to each other and folded so as to overlap each other and form a sturdy horizontal support surface on which the stretcher 6 is received.

This embodiment of the patient transport unit 5 as shown in FIGS. 7 and 8 advantageously provides a larger space for the patient 7 in comparison to the first and second embodiments. For this reason, the present third embodiment is especially suitable for transporting a patient 7 who requires particularly intensive care or treatment during the flight, and thereby requires, for example, two or more medical personnel and a greater than usual degree of medical equipment and medical supplies, as well as a greater need for access to the entire body of the patient 7.

Figure 9:
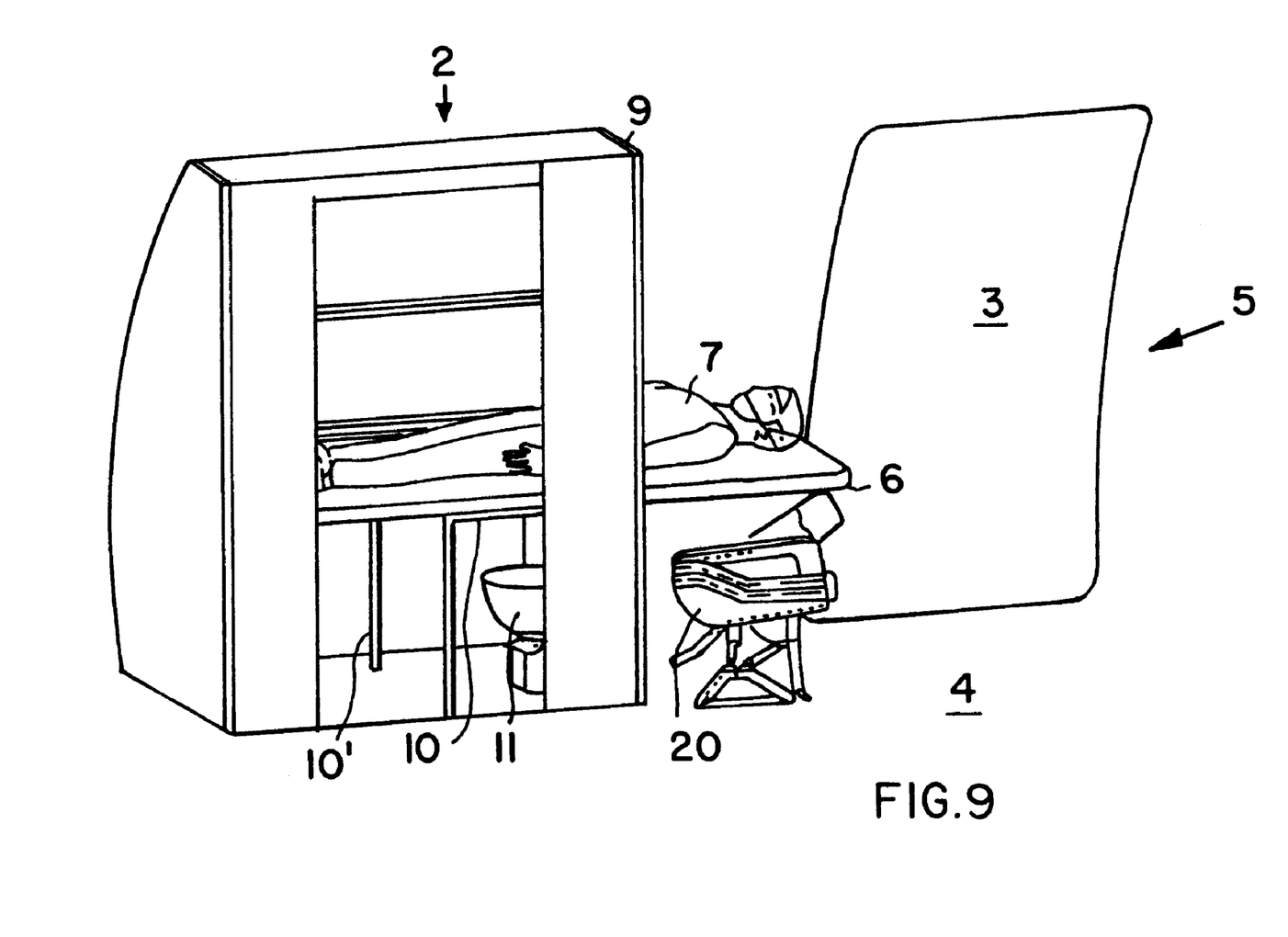
FIG. 9 is a schematic perspective view similar to FIG. 5, but showing an alternative arrangement with a folded-down passenger seat.

FIG. 9 is a perspective view of the first embodiment similar to FIG. 5, but with an alternative arrangement of a passenger seat 20 of which the seatback is tilted down to accommodate the stretcher 6. Namely the folded-down seatback of the seat 20 forms a support surface for at least a portion of the stretcher 6 as shown.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a passenger aircraft including a fuselage enclosing a passenger cabin, a cabin door openably arranged in a doorway opening of said fuselage, a doorway clearance area in said passenger cabin extending inwardly into said passenger cabin from said doorway opening, a passenger seating area in said passenger cabin, and a compartment that is arranged in said passenger cabin and is at least partially enclosed from said passenger seating area,     an improved patient transport arrangement comprising a patient supporting stretcher and at least one of medical equipment and medical supplies,     wherein said compartment is located adjacent to said doorway clearance area and forms at least a part of said patient transport arrangement, and wherein said patient transport arrangement is so configured, arranged and adapted so that in a first configuration of said patient transport arrangement said stretcher is positioned and supported horizontally at least partially in said doorway clearance area at least during cruise flight of said aircraft, and so that in a second configuration of said patient transport arrangement said stretcher is positioned and supported horizontally at a location in said passenger cabin completely outside of said doorway clearance area to leave said doorway clearance area unobstructed for passenger passage during at least one of boarding, landing, and deplaning phases of operation of said aircraft.

2. The improved patient transport arrangement in the passenger aircraft according to claim 1, wherein said compartment is so configured, arranged and adapted so that in said second configuration of said patient transport arrangement said stretcher is positioned and supported horizontally at said location which is at least partially in said compartment at least during said boarding and deplaning phases of operation of said aircraft.

3. The improved patient transport arrangement in the passenger aircraft according to claim 1, wherein said compartment includes a larger main compartment and a smaller storage compartment that adjoins said main compartment and that is located between said main compartment and said doorway clearance area, and wherein a top surface of said storage compartment is so positioned and arranged so that it supports at least a portion of said stretcher thereon at least in said first configuration of said patient transport arrangement.

4. The improved patient transport arrangement in the passenger aircraft according to claim 1, wherein said passenger seating area includes passenger seats arranged between said compartment and said doorway clearance area, wherein said seats include down-foldable seatbacks that can be folded down to form a support surface for at least a portion of said stretcher at least in said first configuration of said patient transport arrangement.

5. The improved patient transport arrangement in the passenger aircraft according to claim 1, wherein said compartment is located immediately next to said cabin door and immediately bordering on said doorway clearance area with no other structure therebetween.

6. The improved patient transport arrangement in the passenger aircraft according to claim 5, wherein said aircraft further includes a stairway that forms a component of said improved patient transport arrangement in that said stairway is so configured, adapted and arranged so that said stretcher can be positioned and supported horizontally at said location which is in said stairway at least in said second configuration of said patient transport arrangement during at least said landing phase of operation of said aircraft.

7. The improved patient transport arrangement in the passenger aircraft according to claim 1, wherein said compartment comprises an endwall facing said doorway clearance area, wherein said endwall comprises a tiltable endwall element having a width that s is equal to or greater than a width of said stretcher, wherein said tiltable endwall element can be tilted open to form an opening in said endwall, and wherein said stretcher can be moved through and can extend through said opening.

8. The improved patient transport arrangement in the passenger aircraft according to claim 7, wherein said compartment further comprises a sidewall adjoining said endwall, wherein said sidewall comprises a tiltable sidewall element that can be tilted open to form a continuation of said opening to provide an enlarged access opening for facilitating access to a patient supported on said stretcher.

9. The improved patient transport arrangement in the passenger aircraft according to claim 1, wherein said compartment is a restroom compartment including a toilet.

10. The improved patient transport arrangement in the passenger aircraft according to claim 9, wherein said restroom compartment is dimensioned to allow accessibility by handicapped persons.

11. The improved patient transport arrangement in the passenger aircraft according to claim 1, wherein said compartment is a completely closeable compartment that is completely encloseable from said passenger seating area, and that is dimensioned large enough relative to said stretcher so that said stretcher can be completely received therein.

12. The improved patient transport arrangement in the passenger aircraft according to claim 1, further comprising a divider for separating said patient transport arrangement from a remainder of said passenger cabin.

13. The improved patient transport arrangement in the passenger aircraft according to claim 12, wherein said divider comprises a divider curtain.

14. The improved patient transport arrangement in the passenger aircraft according to claim 1, wherein said passenger seating area includes at least sixteen passenger seats.

15. The improved patient transport arrangement in the passenger aircraft according to claim 1, further including a toilet and a washbasin in said passenger cabin.

16. The improved patient transport arrangement in the passenger aircraft according to claim 15, wherein said toilet and said washbasin are arranged within said compartment.

17. In an aircraft including a fuselage enclosing a passenger cabin, a cabin door openably arranged in a doorway opening of said fuselage, a doorway clearance area in said cabin extending inwardly from said doorway opening into said cabin, a restroom compartment that houses a toilet and that is bounded at least in part by three walls within said passenger cabin, a patient-supporting stretcher, and at least one of medical equipment and medical supplies, an improvement wherein said restroom compartment, said stretcher, and said at least one of medical equipment and medical supplies are parts of a patient transport arrangement, wherein at least one of said walls of said compartment is an openable wall that comprises an openable wall element that is openable to provide a pass-through opening in said openable wall, and wherein said patient transport arrangement can be configured in a first configuration with said openable wall element opened and said stretcher extending horizontally through said passthrough opening with a first portion of said stretcher arranged and supported inside said restroom compartment and a second portion of said stretcher arranged and supported outside of said restroom compartment.

18. The improvement in the aircraft according to claim 17, wherein said patient transport arrangement can be configured in a second configuration with said openable wall element positioned to close said pass-through opening and with the entirety of said stretcher arranged and supported horizontally outside of said restroom compartment.

19. The improvement in the aircraft according to claim 18, wherein said restroom compartment is arranged adjacent and sufficiently close to said doorway clearance area so that said stretcher is positioned at least partly in said doorway clearance area when said patient transport arrangement is in said second configuration, and so that said stretcher needs to be moved only in a straight line parallel to a lengthwise axis of said aircraft between said first configuration and said second configuration.

20. The improvement in the aircraft according to claim 19, further comprising a storage compartment arranged adjacent to and between said openable wall of said restroom compartment and said doorway clearance area, wherein said first portion of said stretcher is supported on top of said storage compartment in said second configuration and said second portion of said stretcher is supported on top of said storage compartment in said first configuration.

21. The improvement in the aircraft according to claim 18, wherein said aircraft includes a stairway extending down from said passenger cabin, and wherein the entirety of said stretcher is positioned and supported horizontally in said stairway in said second configuration.

22. The improvement in the aircraft according to claim 21, wherein said restroom compartment is arranged with said openable wall positioned directly next to said cabin door and adjoining said doorway clearance area, and wherein said second portion of said stretcher is arranged and supported in said doorway clearance area in said first configuration.

23. The improvement in the aircraft according to claim 21, wherein said stairway comprises enclosure walls including at least one tiltable wall element that can be tilted into a horizontal position with said stretcher supported thereon in said second configuration.

24. The improvement in the aircraft according to claim 17, wherein said restroom compartment is large enough so that said patient transport arrangement can be configured in a second configuration with said openable wall element positioned to close said passthrough opening and with the entirety of said stretcher arranged and supported horizontally inside said restroom compartment.

25. The improvement in the aircraft according to claim 24, wherein said restroom compartment is arranged adjacent and sufficiently close to said doorway clearance area so that said stretcher is positioned at least partly in said doorway clearance area when said patient transport arrangement is in said first configuration, and so that said stretcher needs to be moved only in a straight line parallel to a lengthwise axis of said aircraft between said first configuration and said second configuration.

26. The improvement in the aircraft according to claim 24, wherein another one of said walls of said restroom compartment is a sidewall that adjoins said openable wall and that includes at least one openable sidewall element adjoining said openable wall element, wherein said openable sidewall element can be opened to form a patient access opening continuous with said pass-through opening in said first configuration.

27. In an aircraft including a fuselage enclosing a passenger cabin, a cabin door openably arranged in a doorway opening of said fuselage, a doorway clearance area in said passenger cabin extending inwardly into said passenger cabin from said doorway opening, and a compartment that is arranged in said passenger cabin and is at least partially enclosed from said passenger cabin, an improved patient transport arrangement comprising a patient supporting stretcher and at least one of medical equipment and medical supplies, wherein said compartment is located adjacent to said doorway clearance area and forms at least a part of said patient transport arrangement, wherein said patient transport arrangement is so configured, arranged and adapted so that in a first configuration of said patient transport arrangement said stretcher is positioned and supported at least partially in said doorway clearance area at least during cruise flight of said aircraft, wherein said compartment is located immediately next to said cabin door and immediately bordering on said doorway clearance area with no other structure therebetween, and wherein said aircraft further includes a stairway that forms a component of said improved patient transport arrangement in that said stairway is so configured, adapted and arranged so that said stretcher can be positioned and supported in said stairway at least in a second configuration of said patient transport arrangement during a landing phase of operation of said aircraft.

28. In an aircraft including a fuselage enclosing a passenger cabin, a cabin door openably arranged in a doorway opening of said fuselage, a doorway clearance area in said passenger cabin extending inwardly into said passenger cabin from said doorway opening, and a compartment that is arranged in said passenger cabin and is at least partially enclosed from said passenger cabin, an improved patient transport arrangement comprising a patient supporting stretcher and at least one of medical equipment and medical supplies, wherein said compartment is located adjacent to said doorway clearance area and forms at least a part of said patient transport arrangement, wherein said patient transport arrangement is so configured, arranged and adapted so that in a first configuration of said patient transport arrangement said stretcher is positioned and supported at least partially in said doorway clearance area at least during cruise flight of said aircraft, and wherein said compartment is a restroom compartment including a toilet.

\* \* \* \* \*